United States Patent
Nagai et al.

[11] Patent Number: 5,957,549
[45] Date of Patent: Sep. 28, 1999

[54] HYDRAULIC BRAKING PRESSURE CONTROL SYSTEM FOR AN AUTOMOTIVE VEHICLE

[75] Inventors: Hiroyuki Nagai; Tadao Saito; Kenji Asano, all of Aichi pref., Japan

[73] Assignee: Aisin Seiki Kabushiki Kaisha, Kariya, Japan

[21] Appl. No.: 08/839,317

[22] Filed: Apr. 17, 1997

[30] Foreign Application Priority Data

Apr. 17, 1996 [JP] Japan ................................. 8-095506
Apr. 17, 1997 [JP] Japan ................................. 9-100486

[51] Int. Cl.$^6$ ............................................. B60T 8/88
[52] U.S. Cl. ............................. 303/122.12; 303/122.03; 303/122.05
[58] Field of Search ..................... 303/122.12, 122.03, 303/122.04, 122.05, 122

[56] References Cited

U.S. PATENT DOCUMENTS

| | | | |
|---|---|---|---|
| 4,841,158 | 6/1989 | Latka | 303/11 |
| 5,494,343 | 2/1996 | Lindenman et al. | 303/122.12 |
| 5,558,414 | 9/1996 | Kubota | 303/122.12 |
| 5,632,531 | 5/1997 | Batistic et al. | |

FOREIGN PATENT DOCUMENTS 43 03 206  8/1994  Germany .
3-96469    4/1991  Japan .

*Primary Examiner*—Robert J. Oberleitner
*Assistant Examiner*—Robert Siconolfi
*Attorney, Agent, or Firm*—Burns, Doane, Swecker & Mathis, L.L.P.

[57] ABSTRACT

A hydraulic braking pressure control system for an automotive vehicle having a hydraulic pressure controlling circuit includes a hydraulic pressure generator that supplies hydraulic braking pressure to wheel brake cylinders of the vehicle through a hydraulic pressure controlling circuit, a pressure control device disposed in the hydraulic pressure controlling circuit between the hydraulic pressure generator and the wheel brake cylinders for controlling the hydraulic braking pressure in each of the wheel brake cylinders, and a reservoir disposed in the hydraulic pressure controlling circuit for storing brake fluid. A pump is disposed in the hydraulic pressure controlling circuit to pump brake fluid, and a motor is operatively connected to the pump to apply a driving force to the pump. A voltmeter is electrically connected to the motor to detect the output voltage of the motor and a calculating arrangement is provided to calculate the value of the decrease gradient of the output voltage of the motor. A condition check device detects that a malfunction has been caused in either the reservoir or the motor based on the calculation results of the calculation arrangement.

10 Claims, 6 Drawing Sheets

HYDRAULIC BRAKING PRESSURE CONTROL SYSTEM FOR AN AUTOMOTIVE VEHICLE

FIELD OF THE INVENTION

The present invention generally relates to a braking system for an automotive vehicle. More particularly, the present invention pertains to a hydraulic pressure control system for an automotive vehicle having a failure detection system.

BACKGROUND OF THE INVENTION

Japanese Patent Laid-Open Publication No. 3-96469 discloses a hydraulic braking pressure control system for a vehicle having a motor failure detection system. The system includes a hydraulic pressure generating apparatus which generates a pressure in response to brake pedal operation, electromagnetic hydraulic pressure control valves which control the hydraulic pressure generated by the hydraulic pressure generating apparatus, a brake cylinder which applies a braking force to the wheels, a reservoir which is connected to the brake cylinder, a pump which sucks brake fluid from the reservoir and supplies brake fluid to the hydraulic pressure generating apparatus, and a motor which drives the pump.

In this system, a pressure control system detects the operating condition of the reservoir and the motor. The pressure control system has a first motor drive device, a second motor drive device, a first condition check device and a second condition check device. The first motor drive device drives the motor for a predetermined time period so the motor rotates at a constant speed. In this system, the time is set at 250 ms. The first condition check device detects the output voltage of the motor after the motor has stopped. Based on the output voltage of the motor, the control system determines if the system has a failure, i.e., if the pump has become stuck or if a fluid leakage to the reservoir has occurred. If the output voltage of the motor, when a predetermined period of time has passed after the motor has stopped, is greater than a predetermined value, the control system determines that there is no failure of the motor or the reservoir. If the output voltage of the motor is smaller than the predetermined value, the system determines that there is either a failure of the pump or a fluid leakage. The predetermined period of time after the motor has stopped is set at a time shorter than a time the output voltage of the motor drops to zero when there is no failure of the pump or the reservoir after the motor reaches the constant speed. The predetermined period of time is set to be a time longer than a time the output voltage of the motor drops to zero when there is a failure of at least the pump or the reservoir.

The second motor drive device drives the motor for a second predetermined period of time which is longer than the first predetermined period of time so the fluid in the reservoir can be sucked completely if the reservoir is full of fluid. The second condition check device determines if sticking of the pump occurs based on the output voltage of the motor after the second motor drive device drives the motor. If the output voltage of the motor, when a predetermined period of time has passed after the motor has stopped, is greater than a predetermined value, the control system determines that the reservoir has a leakage. If the output voltage of the motor is smaller than the predetermined value, the system determines that a pump stick has occurred.

However, the system described above suffers from a variety of drawbacks and disadvantages. In one respect, The system determines a failure according to the output voltage drop after the motor reaches a constant speed. As a result, the motor drive period becomes longer and motor operating noise lasts longer.

In addition, if the system stops the motor before the motor reaches a constant speed, the output voltage of the motor becomes smaller. As a result, the time it takes the output voltage of the motor to drop to zero becomes too short so the system cannot accurately detect a failure.

The system also does not take into account the value of the operating pressure. If the pressure is near zero even when brake fluid still remains in the reservoir, the output voltage of the motor drops more slowly than when the pressure is high. The system may thus make an error that there is no failure.

SUMMARY OF THE INVENTION

In light of the foregoing, a need exists for an improved hydraulic braking pressure control system that is able to overcome the above drawbacks.

In one respect, it would be desirable to provide a hydraulic braking pressure control system which can determine a failure of the reservoir and the motor without rotating a motor at a constant speed.

It would also be desirable to provide a hydraulic braking pressure control system which can accurately detect if brake fluid remains in the reservoir.

In accordance with the present invention, a hydraulic braking pressure control system for an automotive vehicle having a hydraulic pressure controlling circuit includes brake cylinders that are adapted to be operatively connected to road wheels of the vehicle for applying a braking force to the wheels, a hydraulic pressure generator for supplying hydraulic braking pressure to the wheel brake cylinder through the hydraulic pressure controlling circuit, and a pressure control device disposed in the hydraulic pressure controlling circuit. The pressure control device is located between the hydraulic pressure generator and the wheel brake cylinders for controlling the hydraulic braking pressure in each of the wheel brake cylinders. A reservoir is disposed in the hydraulic pressure controlling circuit for reserving brake fluid, and a pump is disposed in the pressure controlling circuit for pumping brake fluid in the hydraulic pressure controlling circuit. A motor is operatively connected to the pump for applying a driving force, and a voltmeter is electrically connected to the motor for detecting an output voltage of the motor. A calculation device calculates a value representing the decrease gradient of the output voltage of the motor and a condition check device detects a malfunction caused in either the reservoir or the motor based on the results calculated by the calculation device.

According to another aspect of the invention, a hydraulic braking pressure control system for an automotive vehicle having a hydraulic pressure controlling circuit includes wheel brake cylinders adapted to be operatively connected to a respective wheel of the vehicle for applying a braking force to the wheels, a hydraulic pressure generator for supplying hydraulic braking pressure to the wheel brake cylinders through the hydraulic pressure controlling circuit, and a control device disposed in the hydraulic pressure controlling circuit, between the hydraulic pressure generator and the wheel brake cylinders, for controlling the hydraulic braking pressure in each of the wheel brake cylinders. First solenoid valves are disposed in the hydraulic pressure controlling circuit for controlling hydraulic pressure supplied to the wheel brake cylinders, and second solenoid valves are disposed in the hydraulic pressure controlling circuit for controlling hydraulic pressure supplied to the wheel brake cylinders. A reservoir is disposed in the hydraulic pressure controlling circuit for storing brake fluid and a pump that is disposed in the hydraulic pressure controlling circuit pumps brake fluid in the hydraulic pressure controlling circuit. A motor is operatively connected to the pump for applying a driving force to the pump, and first and second motor drives control the motor. A voltmeter is electrically connected to the motor for detecting an output voltage of the motor, wherein the output voltage has a decrease gradient associated therewith. An arrangement is also provided for calculating a value of the decrease gradient of the output voltage when the first motor drive stops the motor. A first condition check device detects a malfunction caused in either the reservoir or the motor based on the calculation results of the calculating device and a second condition check device detects a malfunction caused in the motor based on the calculation results of the calculating device.

BRIEF DESCRIPTION OF THE DRAWING FIGURES

Additional features and aspects of the present invention will become more apparent from the following detailed description of a preferred embodiment considered with reference to the accompanying drawing figures in which like elements are designated by like reference numerals and wherein.

DETAILED DESCRIPTION OF A PREFERRED EMBODIMENT

Figure 1:
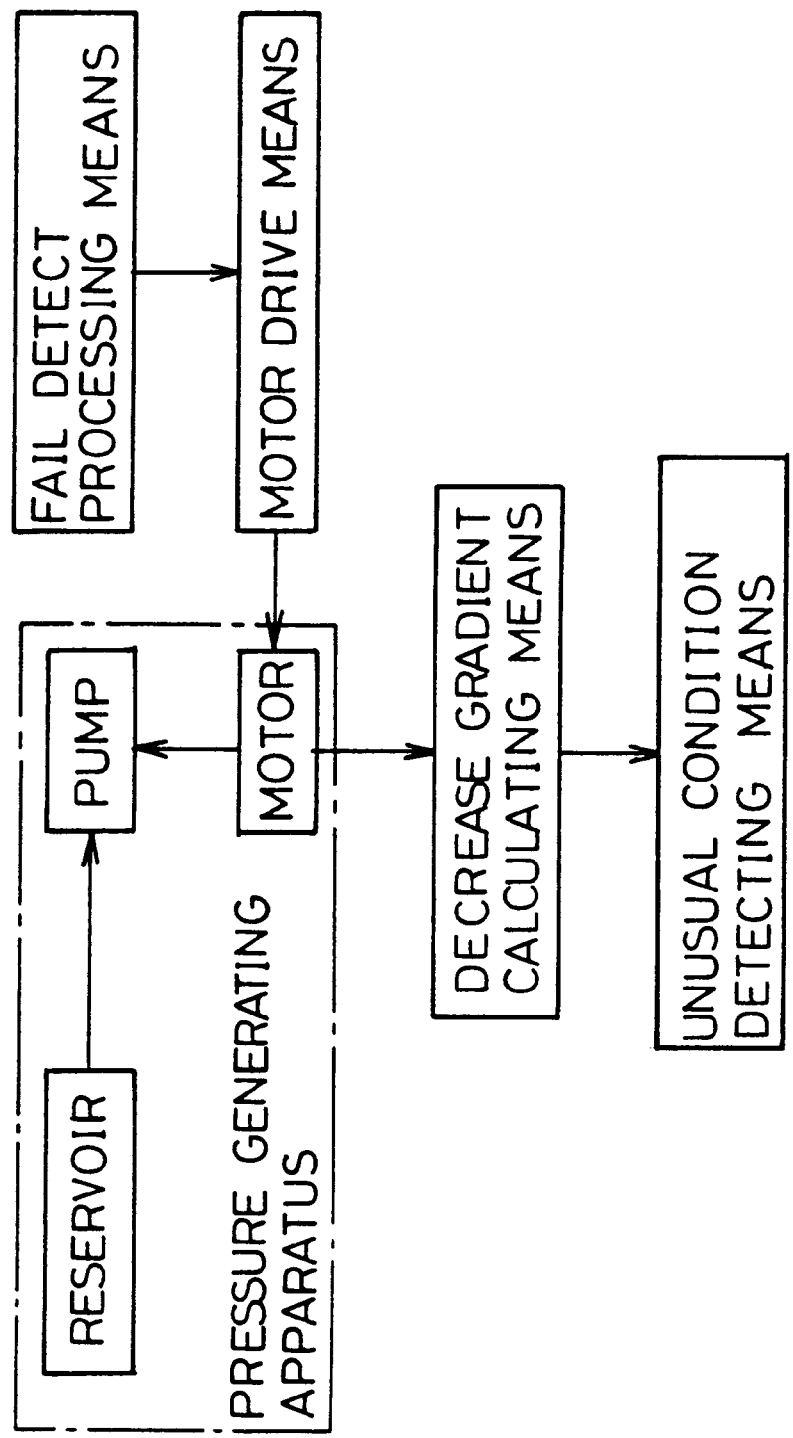
FIG. 1 is a system block diagram setting forth a general illustration of various features of the hydraulic braking pressure control system according to the present invention.
Figure 3:
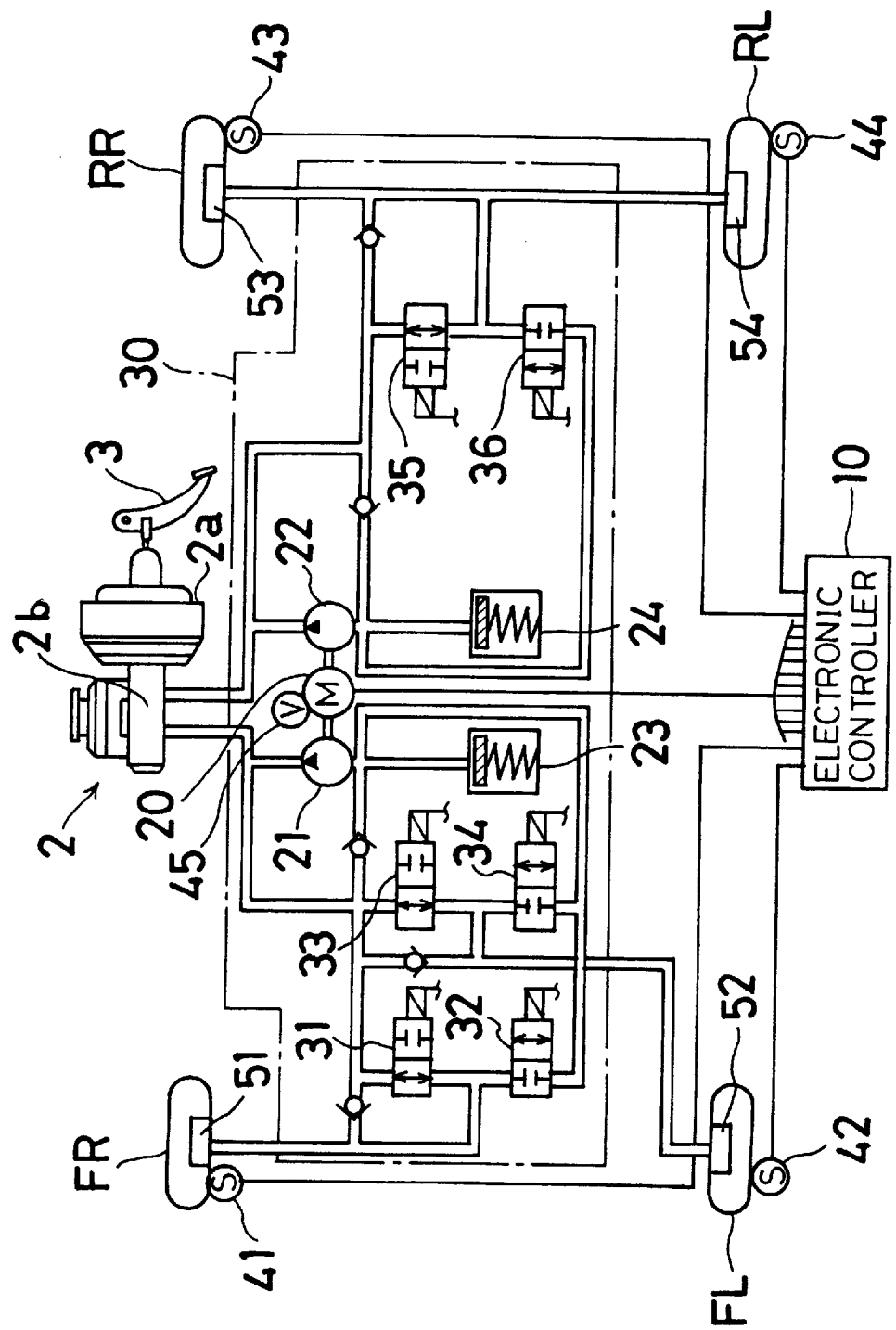
FIG. 3 is a schematic diagram of a hydraulic braking pressure control system of the present invention.
Figure 5:
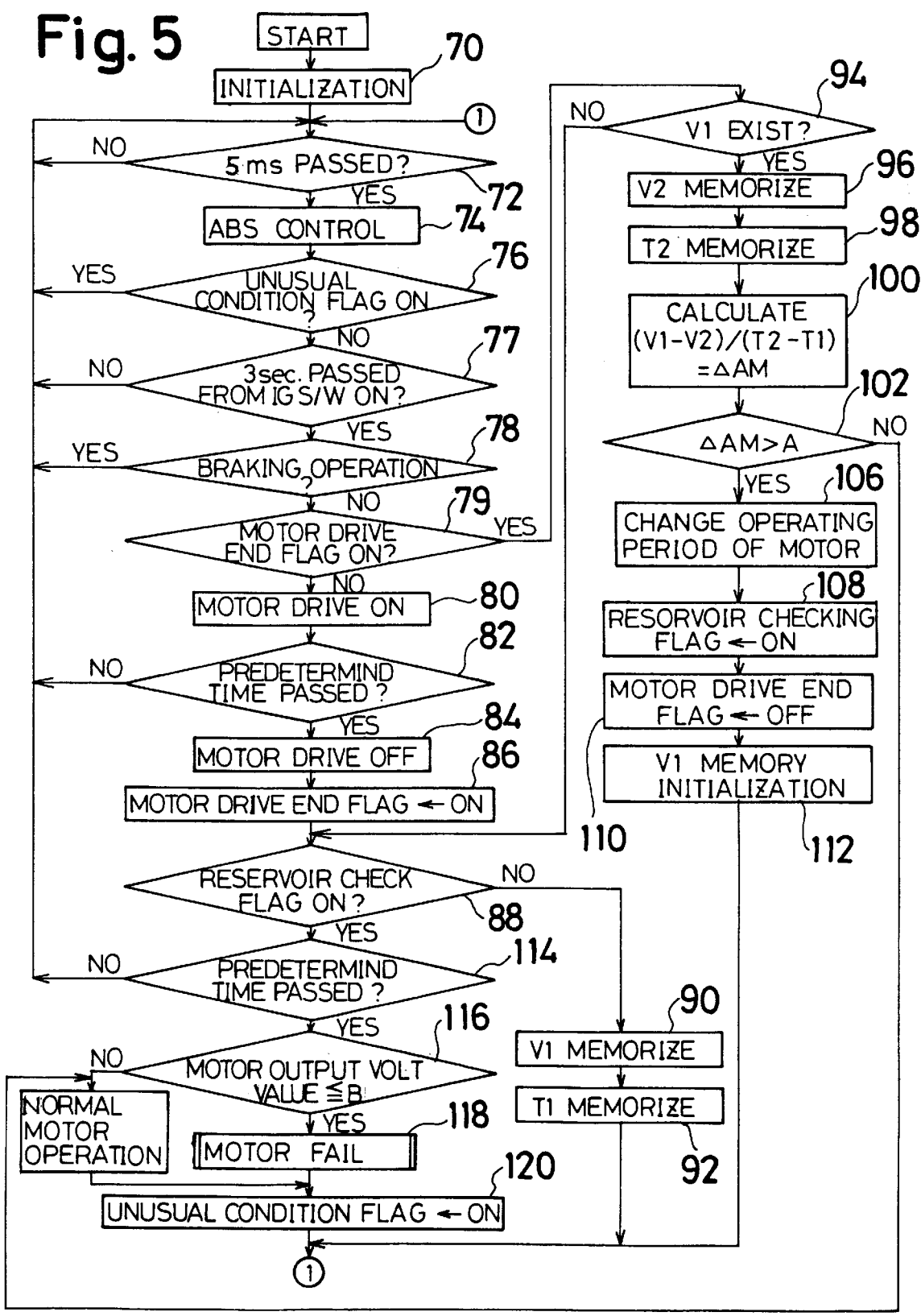
FIG. 5 is a flowchart representing the operation of the failure detection of the electronic controller according to the present invention.

Generally speaking and with reference initially to FIGS. 1 and 3, the hydraulic braking pressure control system for an automotive vehicle in accordance with the present invention includes a pair of reservoirs 23, 24, a pair of pumps 21, 22 each connected to a respective one of the reservoirs, a motor 20 connected to the pumps, a fail detect processing means (also shown as steps 77, 78 in the flowchart of FIG. 5), a motor drive means (also shown as step 80 in the FIG. 5 flowchart), a decrease gradient calculating means (also depicted as step 100 in the FIG. 5 flowchart) and a condition detecting means (also shown as step 102 in the flowchart of FIG. 5).

Figure 2:
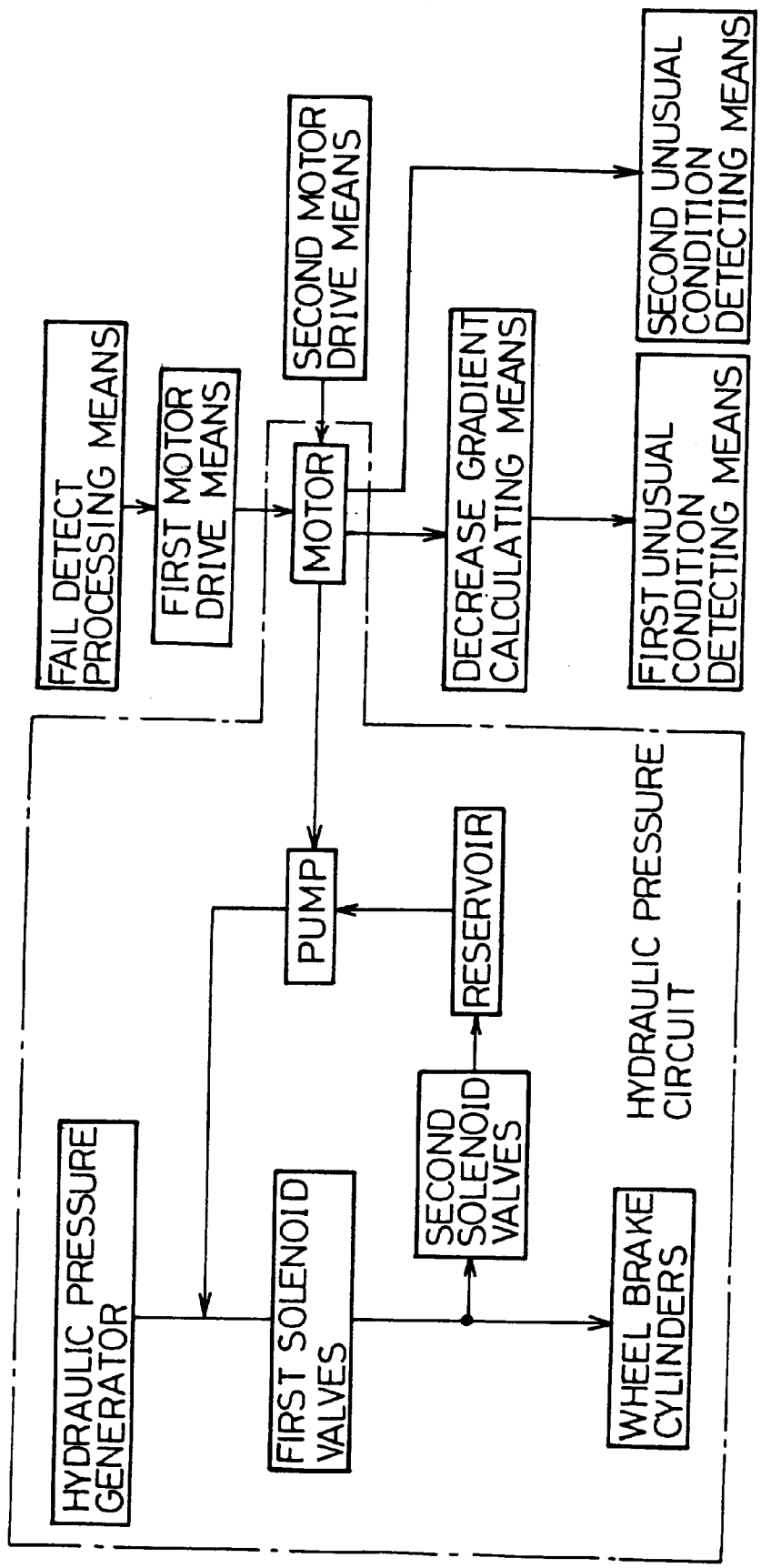
FIG. 2 is a system block diagram similar to FIG. 1, but setting forth a more detailed illustration of various features of the hydraulic braking pressure control system according to the present invention.

FIG. 2, in conjunction with FIG. 3, sets forth a more detailed illustration of the features associated with the present invention. As illustrated, the system includes a pair of reservoirs 23, 24, a pair of pumps 21, 22 each connected to a respective one of the reservoirs, first solenoid valves 31, 33, 35, second solenoid valves 32, 34, 36, a hydraulic pressure generator 2, wheel brake cylinders 51, 52, 53, 54, a fail detect processing means (also represented as steps 77, 78 in the FIG. 5 flowchart), a first motor drive means (which can effect a 50 ms drive), a second motor drive means (which can effect a 1 sec. drive), a decrease gradient calculating means (also depicted as step 100 in the flowchart of FIG. 5), a first condition detection means (also shown as step 102 in the FIG. 5 flowchart), and a second condition detecting means (also depicted as step 116 in the flowchart of FIG. 5).

Referring to FIG. 3, a hydraulic pressure circuit 30 connects the hydraulic pressure generator 2 to the wheel brake cylinders 51, 52, 53, 54 that are operatively mounted on the road wheels FR, FL, RR and RL. The hydraulic pressure generator 2 comprises a master cylinder 2b and a booster 2a, and operates in response to the depression of a brake pedal 3. The pumps 21, 22, the reservoirs 23, 24 and the electromagnetic controlled solenoid valves 31, 32, 33, 34, 35, 36 are disposed in the hydraulic pressure circuit 30. The road wheel FR designates the road wheel at the fore right side as viewed from the position of the driver's sad wheel at the fore left side, the road wheel RR designates the road wheel at the rear right side, and the road wheel RL designates the road wheel at the rear left side. In this embodiment, a front and rear dual circuit system is formed as shown in FIG. 3.

The hydraulic pressure circuit 30 generally designated in FIG. 3 includes the pair of solenoid valves 31, 32 that are disposed in the portion of the hydraulic circuit connecting one of the output ports of the master cylinder 2b to the wheel brake cylinder 51, the pair of solenoid valves 33, 34 that are disposed in the portion of the hydraulic circuit connecting the one output port of the master cylinder 2b to the wheel brake cylinder 52, and the pump 21 that is disposed between the master cylinder 2b and the solenoid valves. The solenoid valves 35, 36 are disposed respectively in the portion of the hydraulic circuit connecting the other output port of the master cylinder 2b to the wheel brake cylinders 53, 54. The other pump 22 is disposed between the master cylinder 2b and the solenoid valves 35, 36.

The pumps 21, 22 are driven by an electric motor 20 so that brake fluid raised to a predetermined pressure is supplied to the hydraulic pressure circuit 30. These hydraulic pressure circuits serve as the circuits through which the hydraulic braking pressure is supplied to the normally open solenoid valves 31, 33 and 35. The hydraulic pressure circuits at the drain side of the normally closed solenoid valves 32, 34 are connected to the pump 21 through the reservoir 23, and the hydraulic pressure circuit at the drain side of the solenoid valve 36 is connected to the pump 22 through the reservoir 24. Each of the reservoirs 23, 24 is provided with a piston and a spring, and functions to store the brake fluid returned from each of the solenoid valves 32, 34, 36 through the hydraulic circuits at the drain side thereof, and to supply the brake fluid to those solenoid valves when the pumps 21, 22 operate.

Each of the solenoid valves 31, 32, 33, 34, 35, 36 is a two-port, two-piston solenoid operated changeover valve. FIG. 3 depicts the solenoid valves in their first operating position when current is not supplied to the solenoid valves 31, 32, 33, 34, 35, 36 so that each of the wheel brake cylinders 51, 52, 53, 54 communicates with the hydraulic pressure generator 2 and the pump 21 or 22. When current is supplied to the solenoid valves, each solenoid valve is changed over to its second operating position so that each of the wheel brake cylinders 51, 52, 53, 54 is shut off from communication with the hydraulic pressure generator 2 and the pump 21 or 22, and is in communication with the respective reservoir 23, 24. Check valves are provided between each of the wheel brake cylinders 51, 52, 53, 54 and the reservoirs 23, 24 to block the counter flow of brake fluid. In accordance with the above-described system, by energizing or de-energizing each of the solenoid valves 31, 32, 33, 34, 35, 36, the hydraulic braking pressure in each of the wheel brake cylinders 51, 52, 53, 54 is increased, decreased or held.

More specifically, when current is not supplied to the solenoid coils of each of the solenoid valves 31, 32, 33, 34, 35, 36, the hydraulic braking pressure is supplied from the hydraulic pressure generator 2 and the pumps 21, 22 to each of the wheel brake cylinders 51, 52, 53, 54 to increase the hydraulic braking pressure in each wheel brake cylinder. When current is supplied to the solenoid coil of each of the solenoid valves 31, 32, 33, 34, 35, 36, each of the wheel brake cylinders 51, 52, 53, 54 is placed in communication with the reservoirs 23, 24 to decrease the hydraulic braking pressure in each wheel brake cylinder. Further, when current is supplied only to the solenoid coils of the solenoid valves 31, 33, 35, the hydraulic braking pressure in each wheel brake cylinder is held. Therefore, by adjusting the time intervals during which the solenoid valves are energized and de-energized, it is possible to provide a so-called pulse-increase mode (step-increase mode) or a pulse-decrease mode so as to gradually increase or decrease the hydraulic braking pressure.

Figure 4:
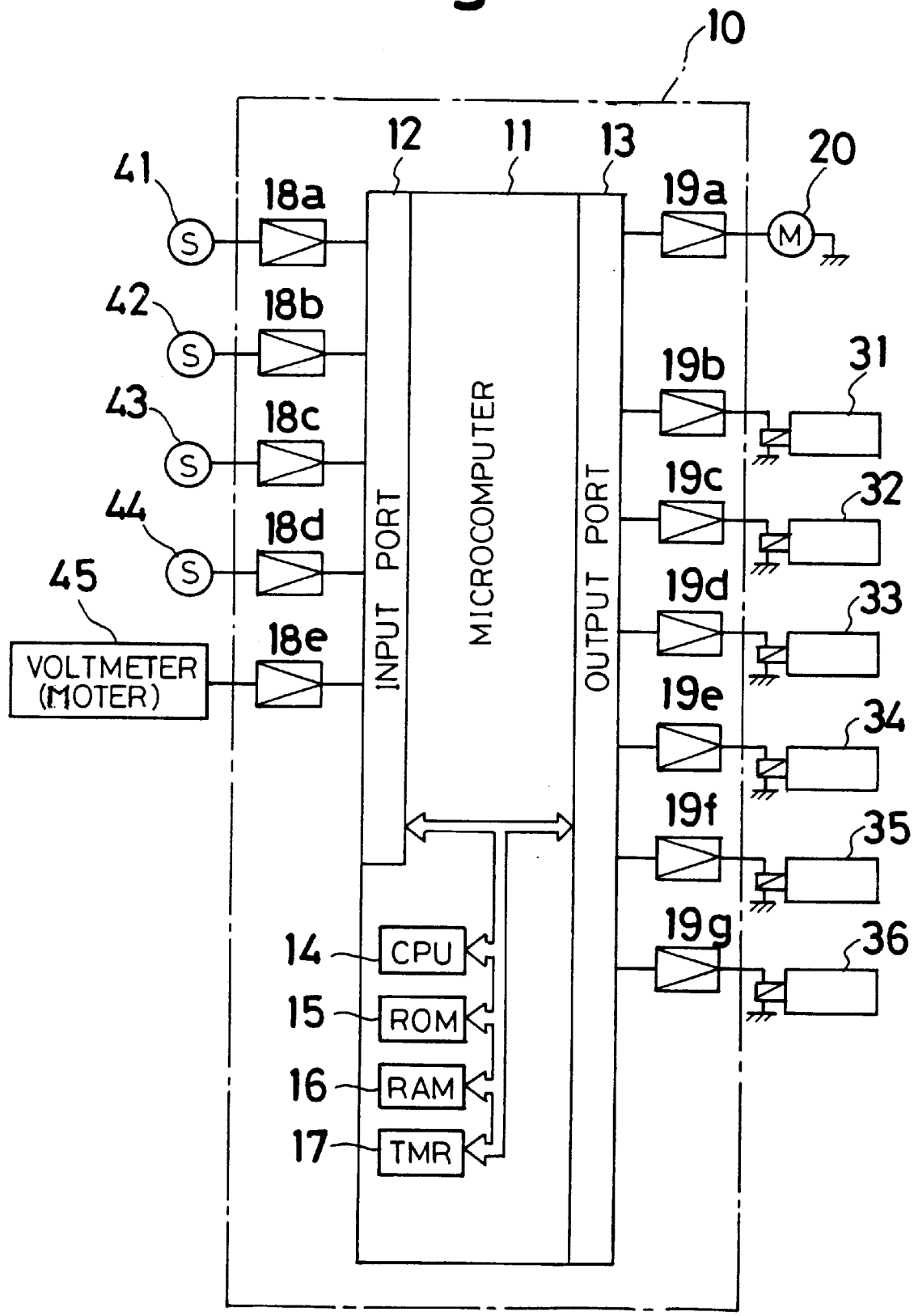
FIG. 4 is a block diagram illustrating the arrangement of the electronic controller shown in FIG. 3.

The above-described solenoid valves 31, 32, 33, 34, 35, 36 are electrically connected to an electronic controller 10 shown in FIG. 4 which controls the operation of the solenoid valves 31, 32, 33, 34, 35, 36. The electric motor 20 that drives the pumps 21, 22 is also connected to the electric controller 10. Each of the wheels FR, FL, RR and RL has a respective wheel speed sensor 41, 42, 43, 44 operatively associated therewith. The wheel speed sensors 41, 42, 43, 44 are also connected to the electronic controller 10. A signal corresponding to the rotational speed of each road wheel, i.e., a wheel speed signal, is supplied to the electronic controller 10 from each of the sensors 41, 42, 43, 44.

Each of the wheel speed sensors 41, 42, 43, 44 used in the present invention can be a well known sensor of the electromagnetic induction type which comprises a pick-up having a coil wound around a permanent magnet and a rotor having an outer peripheral end thereof provided with teeth, and functions to output a voltage with a frequency proportional to the rotational speed of each road wheel. Of course, other types of sensors may also be used instead of the above-described type of sensor.

As shown in FIG. 3, a voltmeter 45 is also operatively associated with the motor 20. The voltmeter 45 is connected to the electric controller 10 and detects the output voltage of the motor 20.

As shown in FIG. 4, the electronic controller 10 is provided with a microcomputer 11 having a central processing unit or CPU 14, a read-only memory or ROM 15, a random access memory or RAM 16, a timer TMR 17, an input port 12 and an output port 13 via a common bus. The signals from each of the wheel speed sensors 41, 42, 43, 44 and the voltmeter 45 are supplied to the input port 12 via respective amplification circuits 18*a*, 18*b*, 18*c*, 18*d*, 18*e* and then to the CPU 14. A control signal is output from the output port 13 to the electric motor 20 via a drive circuit 19*a*, and is supplied to the solenoid valves 31, 32, 33, 34, 35, 36 via respective drive circuits 19*b*, 19*c*, 19*d*, 19*e*, 19*f*, 19*g*. In the microcomputer 11, the ROM 15 memorizes a program corresponding to the flowchart shown in FIG. 5, the CPU 14 executes the program while the ignition switch (not shown) is closed, and the RAM 16 temporarily memorizes variable data necessary for executing the program, for example a value of V1, V2, T1 and T2. The electronic controller basically includes semiconductor relays that generate high speed processing.

In the embodiment of the present invention as constituted above, the program routine corresponding to the flowchart shown in FIG. 5 starts when an ignition switch (IG S/W) is turned on, and the system initializes itself at step 70 to clear various calculated data, e.g., V1, V2, T1 and T2 etc., which will be described later.

At Step 72, the system determines whether or not a set time period (e.g., 5 ms) has passed. If the set time period has passed, the system proceeds to Step 74, otherwise the system proceeds to Step 72 again. That is, Step 74 periodically proceeds every 5 ms. At Step 74, anti-skid control (ABS control) is executed under necessity conditions. Step 74 (anti-skid control) is only executed under the condition that the brake pedal 3 is operated and a condition flag is ON. At Step 76, the system determines whether or not an unusual condition flag is ON. If the reservoir condition is not a normal condition, the condition flag is set to ON. If the condition flag is ON, the system proceeds to Step 72. Otherwise, that is if the condition flag is OFF, the system proceeds to Step 77 to determine whether or not three seconds have passed from the time the ignition switch was turned on. If the system detects that three seconds have passed, the system proceeds to Step 78. Otherwise, the system proceeds to Step 72.

At Step 78, the system determines whether or not a brake pedal has been operated. If the brake pedal is being operated, the system proceeds to Step 72. Otherwise, the system moves on to step 79. At Steps 77 and 78, the system determines whether or not the failure detecting process has been established. At Steps 77 and 78, the system establishes a failure detecting processing means. If the failure detecting process is established, the system proceeds to Steps 79 and 80.

At Step 79, the system determines whether or not a motor drive end flag is ON. If the motor drive end flag is ON, the system proceeds to Step 94. Otherwise, the system proceeds to Step 80 where a motor drive on signal (i.e., current) is supplied to the motor 20. The system does not execute Step 86 when the motor drive end flag is set to OFF. At step 82, the system determines whether or not a predetermined time has passed. If the predetermined time has passed, the system proceeds to Step 84 where a motor drive off signal is output to turn off the motor. At Step 82, the system determines whether or not the predetermined period of time has reached 50 ms. Within the 50 ms time period, the system executes Steps 72 to 82 over and over. The predetermined period of time is set smaller than the time required for the motor to reach a constant speed. Consequently, the motor 20 stops before the motor reaches a constant speed as shown in Step 84.

At Step 86, a motor drive end flag is set ON to indicate that the motor drive has ended. At Step 88, the system determines whether or not a reservoir check flag is set to ON. If the reservoir check flag is ON, the system proceeds to Step 114. Otherwise, the system proceeds to Step 90. At Step 88, the system determines whether or not brake fluid remains in the reservoir. At Step 90, a V1 value (Voltage value) of the motor 20 is memorized in the RAM 16. The value V1 represents the output port voltage value of the motor 20, when the motor 20 has completed the 50 ms operation. Thereafter, at Step 92, the system memorizes the current time or timing in the RAM 16. The time or timing is measured by the timer TMR 17. Then, the system returns to Step 72 and executes Steps 72 through 78. At Step 79, the system proceeds to Step 94 according to the results of Step 86.

In Step 94, the system determines whether or not the V1 value exists. If the V1 value exists, the system proceeds to Step 96 and the system memorizes a V2 value (voltage value) of the motor 20 in the RAM 16. At step 98, the system memorizes the current time or timing in the RAM 16. In this embodiment, a detecting time or timing of the V2 value is set at 5 ms from a time when the motor has stopped. The 5 ms is set for the motor voltage value in order to drop to zero volts. The time or timing is measured by the timer TMR 17. At Step 100, an absolute value of a decrease gradient of the output voltage is calculated according to following formula (1).

$$\Delta AM = \frac{V1 - V2}{T2 - T1} \qquad (1)$$

Next, At Step 102, the calculated ΔAM is compared with a predetermined value A. If the system determines that the decrease gradient is greater than the predetermined value A, the system proceeds to Step 106 and changes the operating period of the motor 20. Otherwise, the system proceeds to Step 104 and determines that the motor is in the normal condition. The predetermined value A is set in accordance with the conditions of the reservoirs 23, 24 and the hydraulic pressure generator 2. The gradient of the output voltage value A is represented by a solid line A in FIG. 6. In this embodiment, the value A is set based on a decrease gradient of the output voltage value when brake fluid remains in the reservoirs 23, 24 and the pressure in the master cylinder 2 is almost zero.

Figure 6:
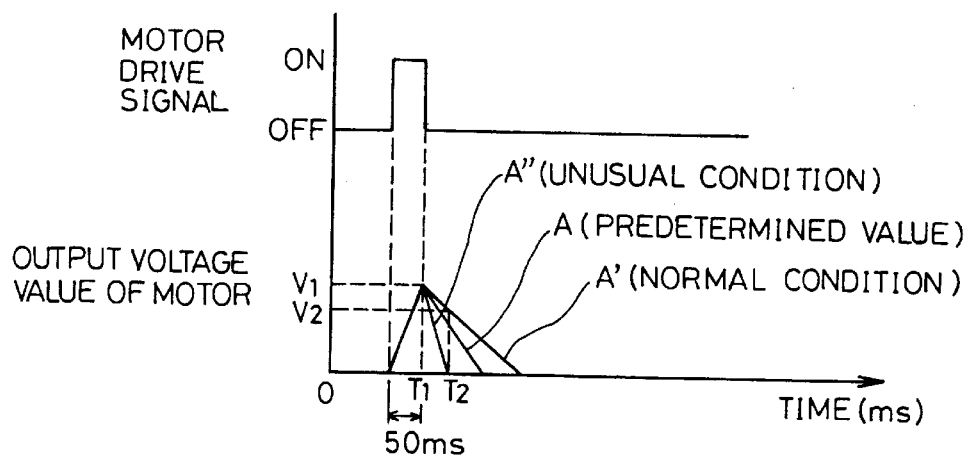
FIG. 6 is a timing chart showing the motor signal and the motor output voltage during the first condition check.

If the αAM is determined to be equal to or smaller than the value A, as shown by a solid line A' in FIG. 6, the system proceeds to Step 104 and determines that the motor 20 is operating under normal conditions. Once the system detects the normal condition, the condition is not detected until initialization occurs to the system.

If the value αAM is determined to be greater than the value A, as shown by a solid line A" in FIG. 6, the system proceeds to Step 106 and changes the operating period of the motor 20. In this embodiment, the period of time is changed from 50 ms to 1000 ms (equal to 1 second). Subsequently, in Steps 108, 110, at least a condition in which brake fluid remains in the reservoirs 23, 24 or a motor failure is detected. After executing Step 106, the system executes Steps 108, 110, 112 and then Steps 72 through 88. At Step 88, the system determines whether or not the reservoir check flag is ON. If the reservoir check flag is determined to be ON, the system proceeds to Step 114. The brake fluid is perfectly removed from the reservoir by a 1000 ms operation of the motor.

Figure 7:
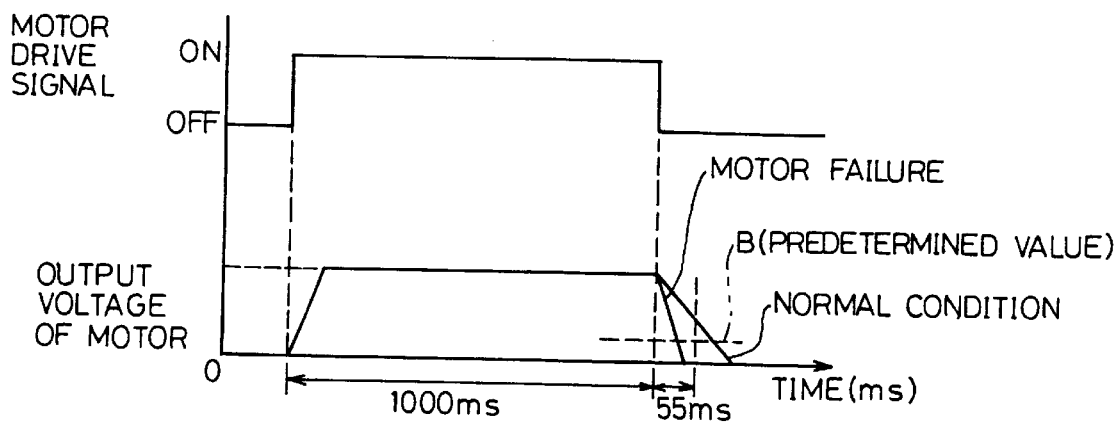
FIG. 7 is a timing chart showing the motor signal and the motor output voltage during the second condition check.

At Step 114, the system determines whether or not a predetermined period of time has passed. In this embodiment, the predetermined period of time is set at 55 ms. The period of time is determined based on the time the motor output voltage value declines to a predetermined value B when the motor and the hydraulic pressure generator 2 are under normal conditions. If the predetermined period of time has not passed at Step 114, the system proceeds back to Step 72. If the predetermined period of time has elapsed at Step 114, the system proceeds to Step 116 and compares the output voltage value of the motor with the value B as shown in FIG. 7. If the output voltage value is equal to or smaller than the value B, the system proceeds to Step 118. In Step 118, the system determines the motor is in failure. If the output voltage value is greater than the value B, the system determines that the motor is under normal operating conditions. The system then proceeds to Step 120 and sets a condition flag to ON.

As mentioned above, according to the present invention, a failure condition of the motor 20 or reservoir can advantageously be detected even though the system does not drive the motor to a constant speed. Also, the hydraulic braking pressure control system of the present invention can accurately detect if brake fluid remains in the reservoir.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention be embraced thereby.

What is claimed is:

1. A hydraulic braking pressure control system for an automotive vehicle having a hydraulic pressure controlling circuit comprising:

wheel brake cylinders for being operatively connected to wheels of the vehicle for applying a braking force to the wheels;

a hydraulic pressure generator for supplying hydraulic braking pressure to the wheel brake cylinders through the hydraulic pressure controlling circuit;

pressure control means disposed in the hydraulic pressure controlling circuit, between said hydraulic pressure generator and said wheel brake cylinders, for controlling the hydraulic braking pressure in each of said wheel brake cylinders;

a reservoir disposed in said hydraulic pressure controlling circuit for storing brake fluid;

a pump disposed in the hydraulic pressure controlling circuit for pumping brake fluid in the hydraulic pressure controlling circuit;

a motor operatively connected to the pump for applying a driving force to the pump;

a voltmeter electrically connected to said motor for detecting an output voltage of said motor, said output voltage having a decrease gradient associated therewith;

means for calculating a value of the decrease gradient of said output voltage of said motor after said motor has been operating for a predetermined period of time, said predetermined period of time being updated based on the results of the calculation performed by said means for calculating; and means for detecting a malfunction caused in at least one of said reservoir and said motor based on results of said calculation means.

2. A hydraulic braking pressure control system as set forth in claim 1, including ignition detecting means for detecting that the ignition is on, said means for detecting being operational only after the ignition is turned on.

3. A hydraulic braking pressure control system for an automotive vehicle having a hydraulic pressure controlling circuit comprising:

wheel brake cylinders for being operatively connected to a respective wheel of the vehicle for applying a braking force to the wheels;

a hydraulic pressure generator for supplying hydraulic braking pressure to said wheel brake cylinders through the hydraulic pressure controlling circuit;

means disposed in the hydraulic pressure controlling circuit, between said hydraulic pressure generator and said wheel brake cylinders, for controlling the hydraulic braking pressure in each of said wheel brake cylinders;

first solenoid valves disposed in the hydraulic pressure controlling circuit for controlling hydraulic pressure supplied to said wheel brake cylinders;

second solenoid valves disposed in the hydraulic pressure controlling circuit for controlling hydraulic pressure supplied to said wheel brake cylinders;

a reservoir disposed in the hydraulic pressure controlling circuit for storing brake fluid;

a pump disposed in the hydraulic pressure controlling circuit for pumping brake fluid in the hydraulic pressure controlling circuit;

a motor operatively connected to said pump for applying a driving force to the pump;

first motor drive means for controlling said motor;

a voltmeter electrically connected to said motor for detecting an output voltage of said motor, the output voltage having a decrease gradient associated therewith;

means for calculating a value of decrease gradient of said output voltage when said first motor drive means stops the motor;

first condition check means for detecting a malfunction caused in either said reservoir or said motor based on calculation results of said means for calculating;

second motor drive means for controlling said motor; and second condition check means for detecting a malfunction caused in said motor based on calculation results of said means for calculating.

4. A hydraulic braking pressure control system as set forth in claim 3, wherein said first motor drive means operates said motor for a predetermined period of time.

5. A hydraulic braking pressure control system as set forth in claim 4, wherein said predetermined period of time is 50 ms.

6. A hydraulic braking pressure control system as set forth in claim 3, said second motor drive means operates said motor for a predetermined period of time.

7. A hydraulic braking pressure control system as set forth in claim 6, said predetermined period of time is one second.

8. A hydraulic braking pressure control system as set forth in claim 3, wherein said first condition detecting means detects the malfunction based on the results of the decrease gradient calculated by the means for calculating.

9. A hydraulic braking pressure control system as set forth in claim 3, wherein said second condition detecting means detects the malfunction based on a comparison of the output voltage with a predetermined value.

10. A hydraulic braking pressure control system as set forth in claim 3, including ignition detecting means for detecting that an ignition has been turned on, said first condition check means operating only after the ignition is turned on.

* * * * *